I. ALLARD.
Screw-Drivers.
No. 157,087.            Patented Nov. 24, 1874.
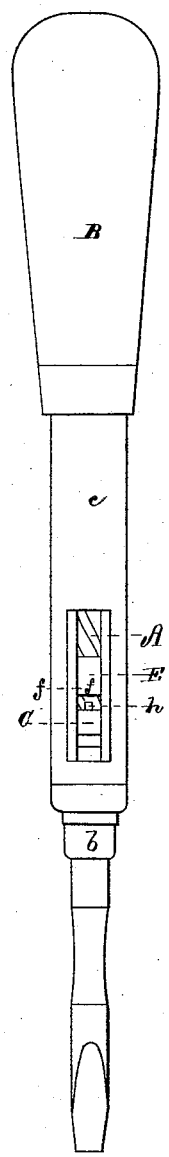
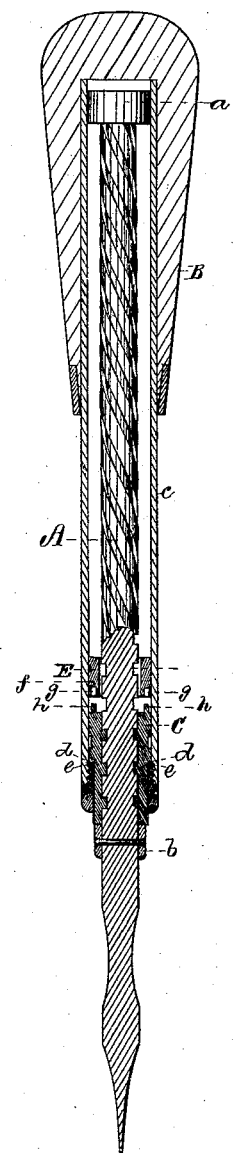
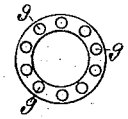
Witnesses.
S. W. Piper
L. N. Miller.
Isaac Allard
by his attorney
R. H. Eddy

UNITED STATES PATENT OFFICE.

ISAAC ALLARD, OF BELFAST, MAINE, ASSIGNOR TO HIMSELF AND FRANK A. HOWARD, OF SAME PLACE.

IMPROVEMENT IN SCREW-DRIVERS.

Specification forming part of Letters Patent No. 157,087, dated November 24, 1874; application filed October 14, 1874.

To all whom it may concern:

Be it known that I, ISAAC ALLARD, of Belfast, of the county of Waldo and State of Maine, have invented a new and useful Improvement in Screw-Drivers; and do hereby declare the same to be fully described in the following specification, and represented in the accompanying drawings, in which—

Figure 1 is a side view, and Fig. 2 a longitudinal section, of a screw-driver with my improvement.

This screw-driver, like that described in Letters Patent No. 89,583, granted on an invention made by me, operates, when applied to a screw, to revolve it when in the nick thereof and pressed hard against it.

My present screw-differs from the patented one in being without any spring, and in having a rotary nut and clutching devices combined with the tubular handle, and the helically-grooved shank, provided with a shoulder for preventing it from being revolved in the nut, and enabling the instrument to be used in back revolving a screw for the purpose of effecting its removal from an article in which it may be inserted. This shoulder avoids the necessity of a spring-catch, and the danger of the wooden part or head of the handle being forced off the tubular part by the shank while back turning a screw.

In the drawings, A denotes the shank, wedge-shaped at its outer end, and provided with a cylindrical head, $a$, at its inner end. It also has a collar or shoulder, $b$, arranged as shown. Furthermore, it is helically grooved between the head and the shoulder, the grooves being generally four in number.

On the part so grooved and arranged concentrically therewith, and in the tubular part $c$ of the handle B, is a rotary nut, C, that screws upon the said grooved part. This nut not only is to revolve freely within the handle, but is to be capable of sliding lengthwise a short distance therein. There is a shoulder, $d$, on the nut, and there is a shoulder, $e$, in the handle, these shoulders being to arrest the nut in its advance. In retreating the nut brings up against a stationary cylinder or part, $f$, of a clutch E. This cylinder arranged and fixed in the tubular part of the handle, has a series, $g$, of holes made in its outer head or end, they being arranged as shown in Figs. 2 and 3, the latter of which is an end view of the cylinder. To operate with the series of holes, one or more pins or studs, $h$, are extended from the next adjacent end of the rotary nut. Instead of such holes and pins, there may be teeth in the next adjacent ends of the cylinder and nut. On taking hold of the shank, and drawing it outward relatively to the handle, the nut will be moved forward and unclutched from the handle, and will readily revolve so as to admit of the shank being pulled out until its head may come into contact with the part $f$.

If, when the handle is grasped in the hand of a person, and the shank is so extended, the outer end of the latter be inserted in the nick of the head of a screw, (whose point may be against an article,) and the handle be pressed forward toward the screw with force, the nut will first be moved back in and clutched to the handle, and next will cause the shank to revolve so as to turn the screw into the article.

What I claim as my invention is—

The combination of the rotary nut C and its clutch E, with the tubular handle B, and the helically-grooved shank A, provided with the shoulder $b$, all being constructed and applied substantially in manner and to operate as specified and shown.

ISAAC ALLARD.

Witnesses:
AUSTIN FULLER,
AUGUSTINE COLLUM.